(12) United States Patent
Denning

(10) Patent No.: US 6,604,541 B1
(45) Date of Patent: Aug. 12, 2003

(54) PILOT OPERATED RUPTURE DISK

(76) Inventor: David M. Denning, P.O. Box 670248, Houston, TX (US) 77267-0248

( * ) Notice: Subject to any disclaimer, the term of this patent is extended or adjusted under 35 U.S.C. 154(b) by 43 days.

(21) Appl. No.: 09/846,746

(22) Filed: May 1, 2001

Related U.S. Application Data

(60) Provisional application No. 60/200,864, filed on May 1, 2000.

(51) Int. Cl.$^7$ .............................................. F16K 17/40
(52) U.S. Cl. ................. 137/68.22; 137/68.23; 137/69; 137/492.5
(58) Field of Search .................... 137/68.19, 68.22, 137/68.23, 69, 488, 489, 489.5, 492.5; 251/28

(56) References Cited

U.S. PATENT DOCUMENTS 1,485,913 A * 3/1924 Gottieb ................... 137/68.22
1,779,056 A * 10/1930 Till ............................. 137/69
2,387,353 A * 10/1945 Raymond ................ 137/68.22

FOREIGN PATENT DOCUMENTS

SE                300346    *   4/1968    ................... 137/69

* cited by examiner

Primary Examiner—Michael Powell Buiz
Assistant Examiner—Ramesh Krishnamurthy
(74) Attorney, Agent, or Firm—Kenneth H. Johnson

(57) ABSTRACT

A rupture disk assembly comprising two rupture disks which form a chamber. The chamber is connected by a first line to the interior of a vessel on which said rupture disk assembly is mounted and a valve in the line reduces the pressure in the chamber to less than 90% of the pressure of said vessel. A second line connects the vessel and a pilot valve, and a third line connects the chamber to the pilot valve and has a pressure reduction valve in the line to prevent flow from the pilot valve to the chamber. The pressure in the chamber is static and said pilot valve is closed while the pressure in the vessel is at or below the set pressure of the pilot valve and a flow is established through said chamber when the pressure in the vessel exceeds the set pressure of the pilot valve.

7 Claims, 2 Drawing Sheets

PILOT OPERATED RUPTURE DISK

This application claims the benefit of Provisional Application No. 60/200,864, filed May 1, 2000.

BACKGROUND OF THE INVENTION

Field of the Invention

The present invention relates rupture valves. More particularly it relates pilot operated rupture valves.

Rupture disks have been found to be inaccurate as to the actual rupture point, notwithstanding the rated rupture point, as much as 50% off. In order to improve the reliability of rupture disks, the present invention is a device that allows the rupture disk to operate at over 90% accuracy of the rated rupture point.

SUMMARY OF THE INVENTION

Briefly the present invention is a rupture disk assembly comprising two rupture disks, a chamber between said disks, a first line in fluid communication between said chamber and the interior of a vessel on which said rupture disk assembly is functionally mounted, a valve in said first line to reduce the pressure in said chamber to less than 90% of the pressure of said vessel, a second line in fluid commuication with said vessel and a pilot valve, and a third line in fluid communication from said chamber to said pilot valve, whereby the pressure in said chamber is static and said pilot valve is closed while the pressure in the vessel is at or below the set pressure of the pilot valve and whereby a fluid flow is established through said chamber when said pressure in said vessel exceeds the set pressure of said valve. Preferably a pressure reduction valve is located in the line between the chamber and the pilot valve to prevent backflow from the pilot valve to the chamber.

BRIEF DESCRIPTION OF THE INVENTION

DETAILED DESCRIPTION

Figure 1:
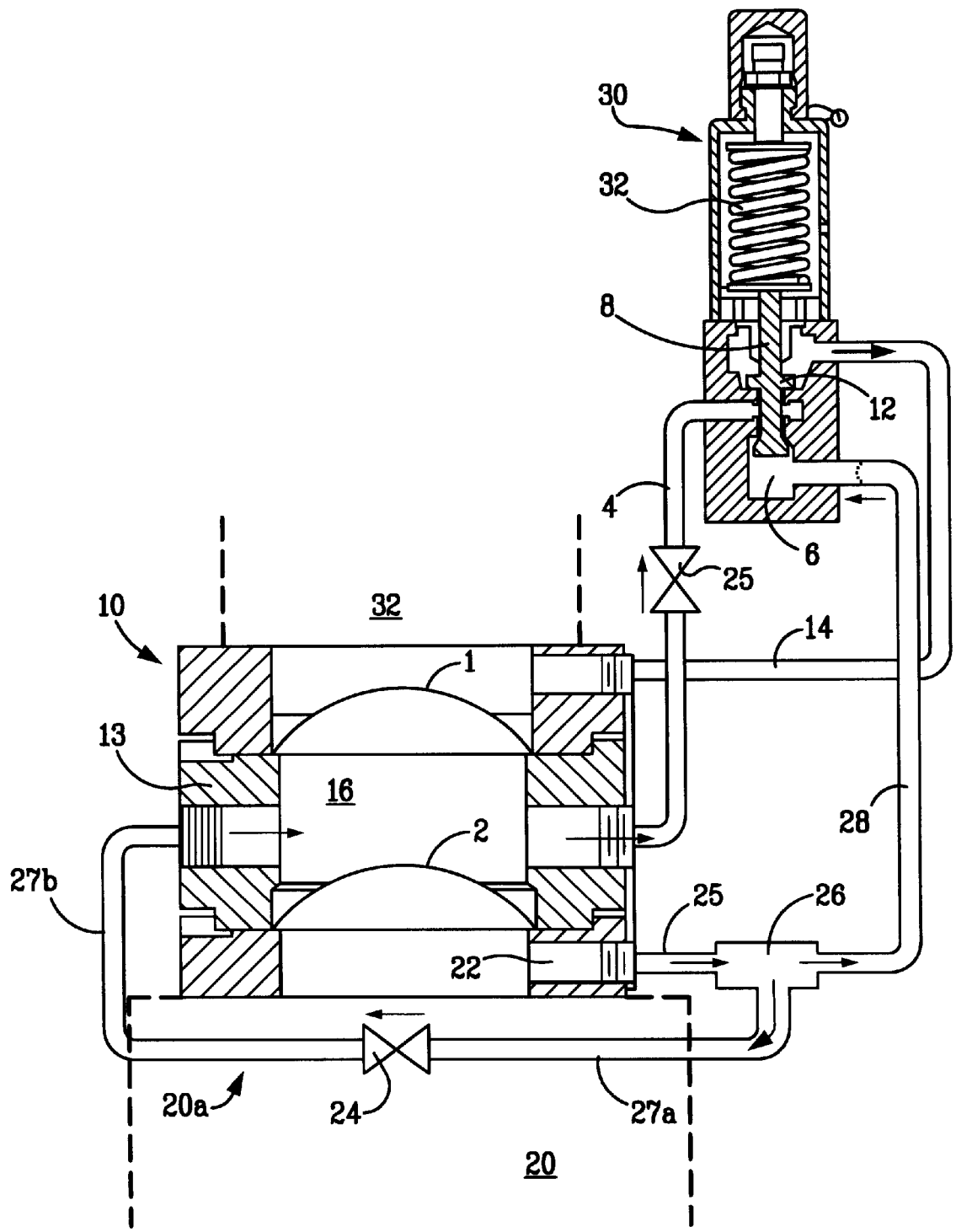
FIG. 1 is an elevational cross section schematic of the present pilot operated rupture valve.
Figure 3:
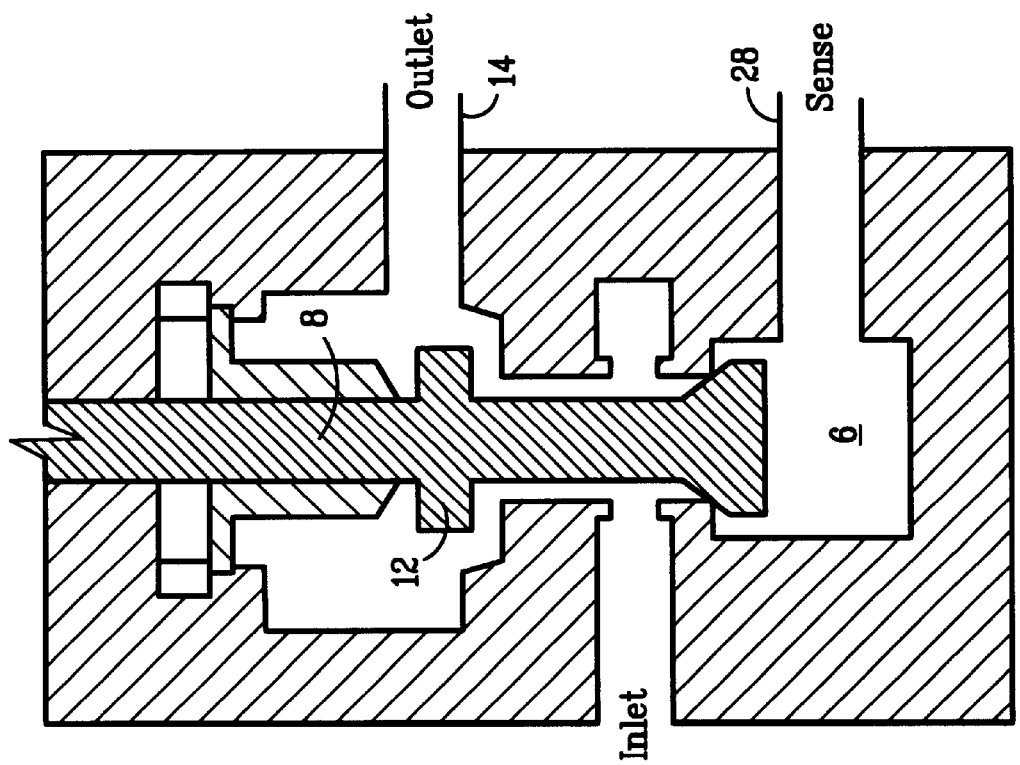
FIG. 3 is a detail schematic of the pilot valve of FIG. 2 in open configuration.
Figure 2:
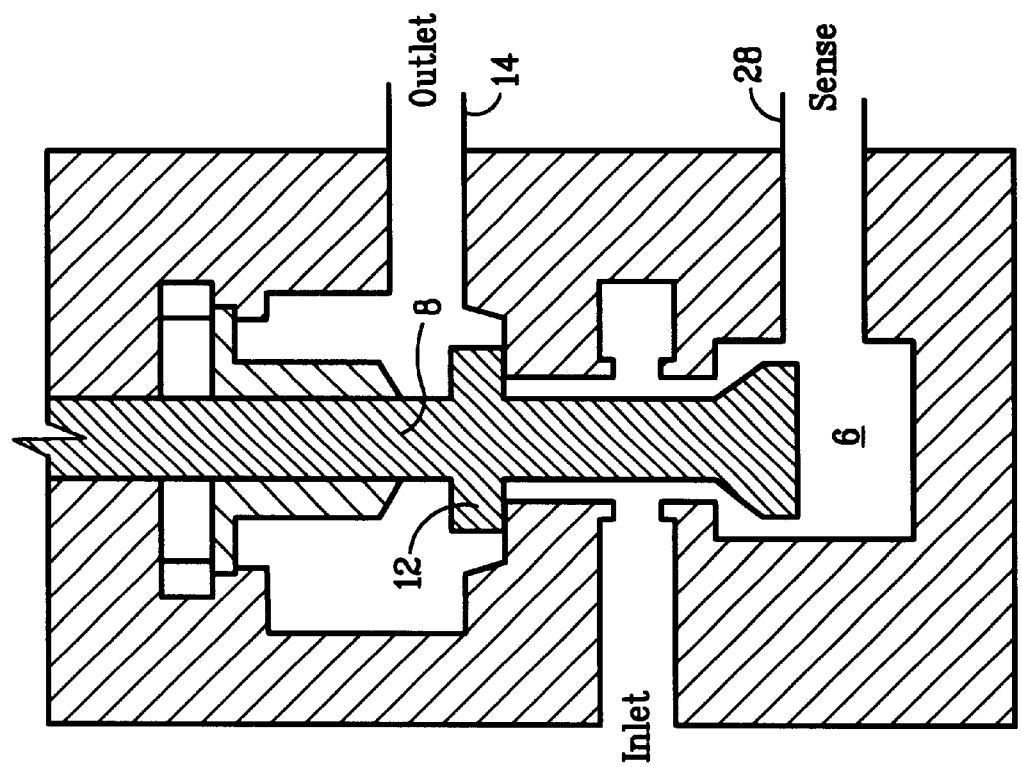
FIG. 2 is a detail schematic of one pilot valve in cross section in the closed configuration.

In order to achieve this high degree of accuracy, a rupture disk assembly mounted on a vessel 20A having at least two rupture disks and having a chamber 16 between at least two rupture disks, said chamber being connected to a pilot valve 30 via line 4 and connected to the vessel interior 20 via inlet 22, line 25, T26, lines 27a/27b, through valves 24 and 25, to reduce the pressure in the chamber to less than 90% of the pressure in the vessel. The pilot valve is directly connected to the interior of the vessel via line 28 from T26 whereby an increase in the vessel above the set point of the pilot valve opens the pilot valve and allows a flow of pressure through the chamber 16 and hence through the pilot valve and venting, preferably to the recovery header 32 for the rupture valve. Thus bleeding the pressure out of the chamber 16 allowing the rupture disk adjacent to the vessel to burst as it approaches its rated value. The pressure in the chamber acts to prevent a rupture at any pressure below that of the chamber and thereby stabilizes the rupture disk having the chamber on its down stream surface. Additional chambers having the same configuration connected to a separate pilot valve may be stacked on the first chamber to obtain even greater rupture accuracy.

The Pilot Operated Rupture Disk, ("PORD,") control system is actuated directly by the fluid pressure of the protected vessel or equipment independent of external energy sources. The PORD pilot control senses the vessel pressure and actuates the rupture disk control area; for example, by means of a spring loaded three-way pilot unit. In the drawings the unit illustrated is a cartridge, comprising: a large ported body; a trigger relay integral with a ported plunger and a force amplifier, and a blowdown relay mounted and locked to the plunger. Other pilot valves such as that shown in U.S. Pat. No. 4,991,620 is also useful for this purpose.

While the protected pressure vessel or pipeline is operating at its normal working pressure, the chamber 16 formed by the rupture disks of the rupture disk assembly 10 is charged by the reduced static pressure against the top of the primary rupture disk 2. The inlet pressure is static throughout the present system, emanating from the pressure vessel 20 (dashed lines)or pressure pick up (not shown), through the connecting tubing 4, through the open blowdown relay 6 and via the ported plunger 8 to the mid-flange chamberl6 of the rupture disk assembly 10.

The trigger relay 12 senses the inlet pressure via the open blowdown relay 6 and ported plunger 8. When the inlet pressure increases to equal the set pressure, the trigger relay pops open instantaneously thus storing energy in the spring 32. This function is a snap action lift and sustained full stroke which closes the blowdown relay, cutting off the fluid supply. The open trigger relay sets up a flowing condition which rapidly exhausts the pressure and volume inside the mid-flange chamber 16 of the rupture disk assembly via the ported plunger, trigger relay, and exhaust connection, normally to the outlet side of the rupture disk assembly via connecting tubing 14. As the pressure is removed from the mid flange chamber the inlet side rupture disk 2 bursts open fully. The first rupture disk's relieving energy impacts the secondary rupture disk and it then bursts open fully thus relieving all accumulated pressure.

Overpressure is not required to attain full capacity, since the rupture disk assembly is actuated to full open position in response to a negligible change in inlet pressure. Pressure in the mid-flange chamber 16 is maintained at less than 100%, preferably less than 90% of the rupture pressure of disk 1, for example 25–75%. The mid-flange chamber 16 is vented through the pilot valve and line 14 when pressure reaches set pressure of the pilot valve.

The invention claimed is:

1. A rupture disk assembly comprising two rupture disks, a chamber between said disks, a first line in fluid communication between said chamber and the interior of a vessel on which said rupture disk assembly is functionally mounted, a valve in said first line to reduce the pressure in said chamber to less than 90% of the pressure of said vessel, a second line in fluid communication with said vessel a pilot valve having a set pressure which actuates and opens said pilot valve, a third line in fluid communication from said chamber to said pilot valve and a valve in said third line between said chamber and said pilot valve, whereby the pressure in said chamber is static and said pilot valve is closed while the pressure in the vessel is at or below the set pressure of the pilot valve and whereby a fluid flow is established through said chamber when said pressure in said vessel exceeds the set pressure of said valve.

2. A pilot operated rupture disc assembly comprising:
   a first flange adapted to operably attach to a pressurized vessel, a second flange mounted to said first flange, a first rupture disc mounted between the first and second flanges, a third flange mounted to said second flange, a second rupture disc mounted between said second and third flanges, a chamber formed within said second flange between said first and second rupture disks, a first connection having a pressure reducing valve therein and adapted to fluidly connect said chamber with said pressurized vessel, a second connection having a pressure reducing valve therein fluidly connecting said chamber and said pilot valve and a third connection adapted to fluidly connect said pilot valve with said pressurized vessel.

3. A pilot operated rupture disc assembly comprising (a) a mounting flange for connecting the rupture disc assembly to a pressurized vessel, the underside of said mounted flange adapted to being subject to the pressure within said pressurized vessel;

(b) a middle flange connected on said mounting flange;

(c) a top flange connected on said middle flange, said top flange having a top flange inlet and a top flange outlet for said assembly;

(d) a first rupture disc mounted between said mounting flange and said middle flange;

(e) a second rupture disc mounted between said middle flange and said top flange;

(f) a chamber formed between said rupture disks in said middle flange having a pressure reducing valve for connection with said pressurized vessel;

(g) a pilot valve having a set point approximately equal to the rupture pressure of said first rupture disc, a pilot valve inlet in communication with said chamber, a pilot valve outlet, and a sensing trigger in communication with said vessel such that when the pressure in said vessel in contact with said sensing trigger increases above the set point the valve opens the connection between the inlet and outlet removing the pressure from within said chamber and allowing said first and second rupture disks to rupture; and (h) a second pressure reducing valve between said chamber and said pilot valve inlet.

4. The pilot operated rupture disk of claim 3 wherein said pilot valve further comprises a spring loaded trigger relay stem, the set pressure of said spring loaded trigger relay stem being determined by the spring loading.

5. The pilot operated rupture disk of claim 3 wherein the outlet of said pilot is connected to said top flange inlet.

6. The pilot operated rupture disk of claim 3 wherein the reduced pressure within said chamber is about twenty five to seventy per cent of said set pressure.

7. The pilot operated rupture disk of claim 3 wherein said top flange outlet is connected to a vent collection system.

* * * * *